United States Patent
Elyashev et al.

(10) Patent No.: US 9,043,454 B2
(45) Date of Patent: May 26, 2015

(54) AUTO SUSPENSE OF VIRTUAL MACHINE ON CLIENT DISCONNECTION

(75) Inventors: Vitaly Elyashev, Ramat Gan (IL); Omer Frenkel, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 1143 days.

(21) Appl. No.: 12/548,276

(22) Filed: Aug. 26, 2009

(65) Prior Publication Data

US 2011/0055372 A1 Mar. 3, 2011

(51) Int. Cl.
*G06F 15/173* (2006.01)
*G06F 9/455* (2006.01)
*G06F 9/44* (2006.01)

(52) U.S. Cl.
CPC .......... *G06F 9/45537* (2013.01); *G06F 9/4418* (2013.01)

(58) Field of Classification Search
CPC ............................ G06F 9/45537; G06F 9/4418
USPC .................................... 709/224, 203
See application file for complete search history.

(56) References Cited

U.S. PATENT DOCUMENTS

| | | | | |
|---|---|---|---|---|
| 4,912,628 A | * | 3/1990 | Briggs | 718/100 |
| 6,658,448 B1 | * | 12/2003 | Stefaniak et al. | 718/104 |
| 7,310,803 B2 | * | 12/2007 | Haughey | 718/107 |
| 7,313,793 B2 | * | 12/2007 | Traut et al. | 718/1 |
| 7,383,405 B2 | * | 6/2008 | Vega et al. | 711/162 |
| 7,574,709 B2 | * | 8/2009 | Erlingsson et al. | 719/310 |
| 7,653,794 B2 | * | 1/2010 | Michael et al. | 711/162 |
| 7,657,888 B2 | * | 2/2010 | Traut et al. | 718/1 |
| 7,685,474 B2 | * | 3/2010 | Viljoen | 714/46 |
| 7,797,587 B2 | * | 9/2010 | Vasudevan et al. | 714/47.1 |
| 7,840,839 B2 | * | 11/2010 | Scales et al. | 714/13 |
| 7,900,005 B2 | * | 3/2011 | Kotsovinos et al. | 711/162 |
| 7,925,850 B1 | * | 4/2011 | Waldspurger et al. | 711/162 |
| 7,966,169 B2 | * | 6/2011 | Vega | 703/23 |
| 8,015,563 B2 | * | 9/2011 | Araujo et al. | 718/1 |
| 8,024,790 B2 | * | 9/2011 | Zhao et al. | 726/17 |
| 8,051,180 B2 | * | 11/2011 | Mazzaferri et al. | 709/227 |
| 2008/0201711 A1 | | 8/2008 | Amir Husain | |

OTHER PUBLICATIONS

"Solid Ice™ Provisioning Manager", Apr. 2008, pp. 1-5, Qumranet, Inc.
"Solid Ice™ Overview", Apr. 2008, pp. 1-15, Qumranet, Inc.

* cited by examiner

Primary Examiner — Philip B Tran
(74) Attorney, Agent, or Firm — Lowenstein Sandler LLP

(57) ABSTRACT

A host controller or a host detects that a client has disconnected from a virtual machine running on the host. The host controller or host initiates a timer upon detecting that the client has disconnected. When the timer times out, the host controller or host saves the state of the virtual machine. The host controller or host causes the virtual machine to be shut down upon saving the state.

20 Claims, 4 Drawing Sheets

AUTO SUSPENSE OF VIRTUAL MACHINE ON CLIENT DISCONNECTION

TECHNICAL FIELD

Embodiments of the present invention relate to hosting virtual machines for remote clients and, more specifically, to automatically suspending virtual machines upon detecting that remote clients have disconnected from the virtual machines.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems.

When a remote client disconnects from a virtual machine without shutting down the virtual machine, the host machine typically leaves the virtual machine running. Conventional host machines do not have any mechanism for saving a state of the virtual machine and automatically shutting the virtual machine down after detecting a client disconnect. This causes the host machines to unnecessarily use system resources for running unused virtual machines.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
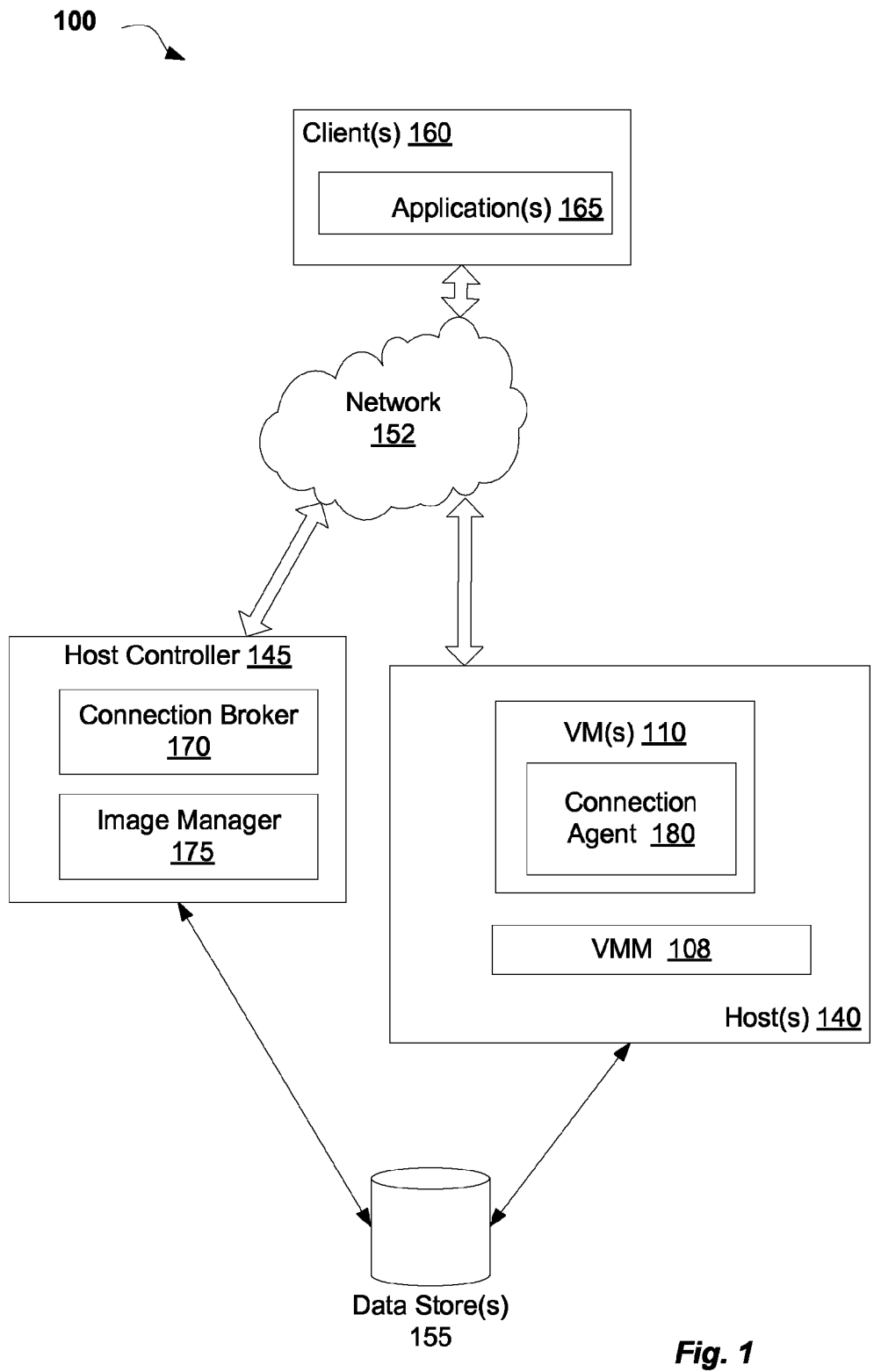
FIG. 1 is a block diagram of a virtualization system, in which embodiments of the invention may operate.

Embodiments of the invention provide for a mechanism for automatically suspending a virtual machine upon detecting a client disconnection. In one embodiment, a host controller or host detects that a client has disconnected from a virtual machine running on the host. The host controller or host initiates a timer upon detecting that the client has disconnected. When the timer times out, the host controller or host saves the state of the virtual machine. The host controller or host causes the virtual machine to be shut down upon saving the state. When the client attempts to reconnect to the virtual machine, the virtual machine is loaded using the saved state. The client is then connected to the virtual machine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting", "receiving", "initiating", "saving", "receiving", "loading", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram of a virtualization system 100, in which embodiments of the invention may operate. The virtualization system 100 includes, but is not limited to, one or more clients 160 communicatively coupled to one or more hosts 140 or a cluster of hosts 140 over a network 152. Network 152 may be a private network (e.g., a local area network (LAN), a wide area network (WAN), etc.) or a public network (e.g., the Internet), and may be a combination of one or more networks.

Each host 140 is a server configured to host one or more virtual machines (VM) 110. The host 140 includes a bare platform hardware that may be a personal computer (PC), server computer, mainframe, or other computing system. The platform hardware can include a processor, memory, input/output devices, etc. The host further includes a virtual machine monitor (VMM) 180 (also known as a hypervisor) and/or a host OS. The VMM 108, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc.

In one embodiment, the VMM 108 is run directly on bare platform hardware. In another embodiment, the VMM 108 is run on top of a host OS. Alternatively, for example, the VMM 108 may be run within, or on top of, another VMM. VMMs may be implemented, for example, in hardware, software, firmware or by a combination of various techniques.

The VMM 108 presents to other software (i.e., "guest" software) the abstraction of one or more virtual machines (VMs) 110, which may provide the same or different abstractions to the various guests (e.g., guest operating systems (OSes)). The guest OSes and the host OS may share the same operating system type, or the host OS may be a different type of OS than one or more guest OSes. For example, a guest OS may be a Windows operating system from Microsoft and a host OS may be a Linux operating system available from Red Hat.

Virtual machines 110 can be, for example, hardware emulation, full virtualization, para-virtualization, and operating system-level virtualization virtual machines. Each virtual machine 110 includes a guest operating system (guest OS) that hosts one or more applications within the virtual machine. The guest OSes running on the virtual machines 110 can be of the same or different types (e.g., both may be Windows operating systems, or one may be a Windows operating system and the other a Linux operating system).

In one embodiment, each virtual machine 110 hosts or maintains a desktop environment providing virtual desktops for remote clients (e.g., client 160). A virtual desktop is a virtualized desktop computer, and thus includes storage, an operating system, applications installed on the operating system (e.g., word processing applications, spreadsheet applications, email applications, etc), and so on. However, rather than these functions being provided and performed at the client 160, they are instead provided and performed by a remote virtual machine 110.

A virtual desktop can represent an output (e.g., an image to be displayed) generated by a desktop application running within the virtual machine 110. Graphics data associated with the virtual desktop can be captured and transmitted to a client 160, where the virtual desktop may be rendered by a rendering agent and presented by a client application (e.g., application 165).

It should be noted that functionality provided to clients such as client 160 by virtual machines 110 is not limited to virtual desktops and may include a wide variety of other server-based virtualization functions made available to the clients 160.

Each client 160 may be a personal computer (PC), palm-sized computing device, personal digital assistant (PDA), etc. Clients 160 may be fat clients (clients that perform local processing and data storage), thin clients (clients that perform minimal or no local processing and minimal to no data storage), and/or hybrid clients (clients that perform local processing but little to no data storage). In one embodiment, clients 160 are not configured with local desktop environments. Instead, clients 160 are configured to obtain their desktop environments from the host or hosts 140 (e.g., via VMs 110). In such an embodiment, clients 160 may essentially act as input/output devices, in which a user can view a desktop environment (e.g., a running instance of an operating system including storage available to the operating system and programs installed and/or running on the operating system) on a monitor, and interact with the desktop environment via a keyboard, mouse, microphone, etc. In one embodiment, a majority of the processing is not performed at the clients 160, and is instead performed by virtual machines 110 hosted by the host 140.

Client 160 includes one or more client applications 165. Each client application 165 may have one or more client-side resources. Client-side resources may include end user devices such as an input/output (I/O) device (e.g., a display, a keyboard, a mouse), a USB device, a local storage device, etc.

Each VM 110 may communicate with one or more clients 160 and/or one or more applications 165 running on those clients 160. All of the applications of a client 160 may communicate with a single VM. Alternatively, each application 165 may communicate with different VMs.

In one embodiment, the VM 110 includes a connection agent 180 that monitors a connection status of one or more clients 160 and/or applications 165. The connection agent 180 may keep track of what clients 160 and/or applications 165 are connected to the virtual machine 110. The connection agent 180 may perform one or more actions when new connections and/or disconnections are detected. In one embodiment, connection agent 180 reports connections and disconnections to host controller 145. Alternatively, or in addition, connection agent 180 may cause VM 110 to be shut down when no clients 160 or applications 165 are connected to the virtual machine 110. Connection agent 180 in one embodiment causes a state of the virtual machine 110 to be saved prior to shutting the VM 110 down. In one embodiment, connection agent 180 causes the current state of the VM 110 to be saved to data store 155.

The host or hosts 140 are connected to one or more data stores 155. Each data store 155 may be a single storage device, or a storage domain that includes one or more storage devices and/or a storage server for managing the storage devices. The data store 155 may be a storage area network (SAN), a network attached storage (NAS), or a combination thereof. Any changes that are made to virtual machines 110, 120 during active sessions for those virtual machines can be stored in the data store 155. Accordingly, clients 160 need only minimal local storage.

The host 140 may be coupled to a host controller 145 (via network 152 as shown or directly) that manages virtual machines 110. The host controller 145 may be an independent server machine or a part of the host 140. The host controller 145 may add a virtual machine, delete a virtual machine, balance the load on the host cluster, provide directory service to the virtual machines, and perform other management functions.

In one embodiment, the host controller 145 includes a connection broker 170 and an image manager 175. Connection broker 170 in one embodiment controls the process by which clients 160 and applications 165 connect to virtual machines 110. Connection broker 170 may handle client authentication, determine appropriate VMs (e.g., VMs associated with login credentials supplied by client 180) to connect clients to, issue commands to host 140 to load the appropriate VMs, determine a connection protocol to use (e.g., RDP, SPICE, etc.) and so on.

In one embodiment, connection broker 170 determines when to automatically shut down virtual machines 110. Depending on the connection protocol used to connect client 160 to VM 110, connection broker 170 may or may not be able to identify when clients are connected to the VM 110. In one embodiment, in which connection broker 170 cannot identify connection statuses to VM 110, connection broker 170 relies on connection updates provided by connection agent 180. When connection broker 170 detects that no clients 160 or applications 165 are connected to a virtual machine 110 (either directly or via updates provided by connection agent 180), connection broker 170 may initiate an automatic VM shutdown sequence. The automatic shutdown sequence may include saving a state of the VM 110 and powering down the VM.

In one embodiment, connection broker 170 initiates a timer when it first detects that no clients are connected to a VM 110. Once the timer times out, connection broker 170 may prompt image manager 175 to save a state of the VM 110, after which the VM 110 may automatically be shut down. If the client 160 later tries to reconnect with the VM 110, the connection broker may cause the VM 110 to be loaded from the saved state, and may establish a new connection between the client 160 and the VM 110.

In one embodiment, image manager 175 manages images of virtual machines 110. Image manager 175 may use one or more VM templates or base images from which to generate new virtual machine images. Subsequent saves of the new virtual machines images may be performed by recording differences between the new virtual machines and the base image. In one embodiment, image manager 175 saves a state of a VM 110 during an automatic shutdown sequence initiated by connection broker 170. In another embodiment, image manager 175 saves a state of the VM 110 during an automatic shutdown sequence initiated by connection agent 180. Saving the state of the VM 110 may include generating an image, such as a point-in-time image or snapshot, of the VM 110. In one embodiment, the generated image includes differences from a last image that was generated for the VM 110 or differences from a template or base image of the VM 110. In another embodiment, the image is generated from scratch (and so does not refer to any other images for reproducing the state of the VM). The image may include a memory state of the VM 110, a state of the VM's storage, a state of registers of a virtualized CPU, and additional aspects of the runtime state of the VM. The runtime state includes, for example, running programs, open windows, etc. The saved state in one embodiment is stored in data store 155.

Figure 2:
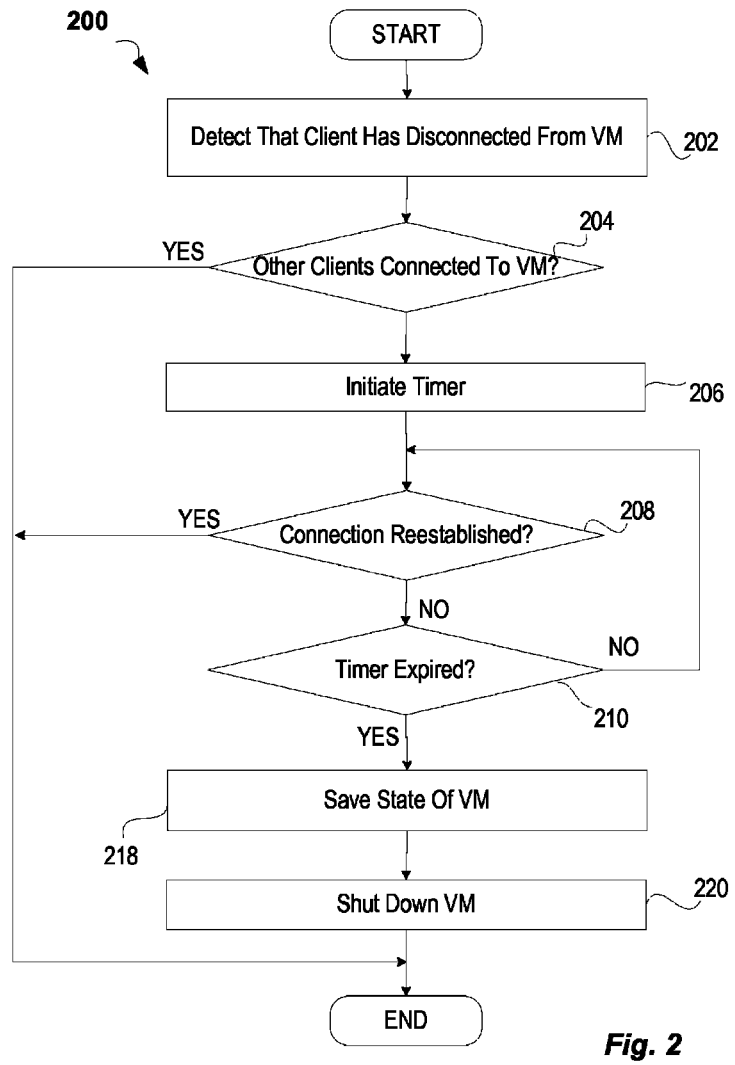
FIG. 2 is a flow diagram illustrating a method for one embodiment of automatically shutting down a virtual machine upon detecting a client disconnection.

FIG. 2 is a flow diagram illustrating a method 200 for one embodiment of automatically shutting down a virtual machine. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by host controller 145 of FIG. 1. In another embodiment, method 200 is performed by host 140 of FIG. 1. Alternatively, method 200 may be performed by host controller 145 and a host 140 operating cooperatively.

Referring to FIG. 2, at block 202 processing logic detects that a client has disconnected from an active virtual machine. In one embodiment, the disconnection is detected by a connection agent operating within the VM, and is reported to processing logic. Alternatively, the disconnection may be detected directly by the processing logic.

At block 204, processing logic determines whether there are any additional clients connected to the VM. If additional clients are connected to the VM, the method ends. If no additional clients are still connected to the VM, the method proceeds to block 206, and a timer is initiated. The timer may be set for a predetermined time period, such as 5 minutes, 20 minutes, 1 hour, etc. In one embodiment, the predetermined time period is user configurable.

At block 208, processing logic determines whether connection has been reestablished with the VM by the client before the timer's expiration. Processing logic may also determine whether any other clients have connected to the VM since the timer was initiated. If the connection has been reestablished, or if another client has connected to the VM, the method ends. If the connection has not been reestablished and no additional clients have connected to the VM, the method proceeds to block 210.

At block 210, processing logic determines whether the timer has timed out (expired). If the timer has not timed out, the method returns to block 208. If the timer has timed out, the method proceeds to block 218.

At block 218, processing logic saves a current state of the VM. In one embodiment, an image such as a point-in-time or snapshot image of the VM is taken to save the state. The image includes the runtime state of the VM. The image may then be stored to a non-volatile storage such as a hard disk drive or optical disk.

At block 220, the VM is shut down. Shutting down the VM automatically when no clients are connected to it saves system resources, and may reduce power consumption. The method then ends.

Figure 3:
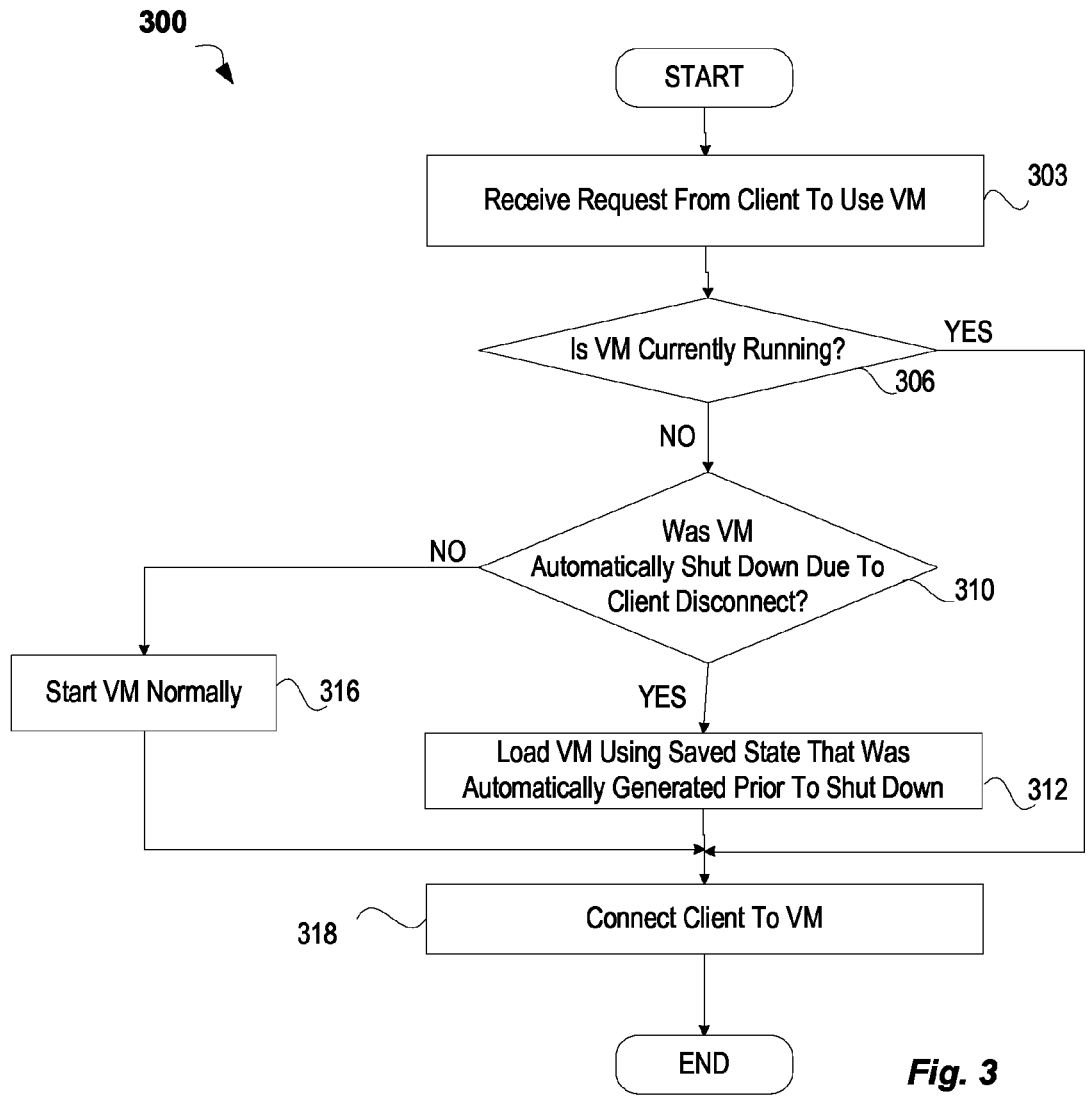
FIG. 3 is a flow diagram illustrating a method for one embodiment of starting up a virtual machine.

FIG. 3 is a flow diagram illustrating a method 300 for one embodiment of starting up a virtual machine. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by host controller 145 of FIG. 1. In another embodiment, method 300 is performed by host 140 of FIG. 1. Alternatively, method 300 may be performed by host controller 145 and a host 140 operating cooperatively.

Referring to FIG. 3, at block 303 processing logic receives a request from a client to use a virtual machine. The request may have been initiated by a user selecting a resume VM button presented in a graphical user interface (GUI) of the client. In one embodiment, the resume VM button is displayed in the GUI of the client if the VM was automatically shut down due to a client disconnect.

At block 306, processing logic determines whether the requested VM is already running. If the VM is currently running, the method proceeds to block 318. If the VM is not currently running, the method continues to block 310.

At block 310, processing logic determines whether the VM was shut down due to a client disconnect. If the VM was not shut down due to a client disconnect, the method proceeds to block 316, and the VM is started normally. Starting the VM normally may be a similar procedure to powering up a desktop computer. For example, drives may be mounted, an OS may be loaded, and one or more startup processes may be initiated. If processing logic detects that the virtual machine was shut down due to a client disconnect, the method proceeds to block 312.

At block 312, the VM is loaded using a saved state that was automatically generated prior to an automatic shut down due to client disconnection. The saved state includes a runtime state of the VM at the time that the client had disconnected. Therefore, loading the VM from the saved state includes resuming the saved runtime state of the VM. The resumed runtime state may include open windows, running programs, etc. The runtime state may be resumed by recreating the state of the VM's memory, registers of a CPU, a swap drive, temporary files, etc. The method continues to block 318.

At block 318, the client is connected to the VM. The method then ends.

Figure 4:
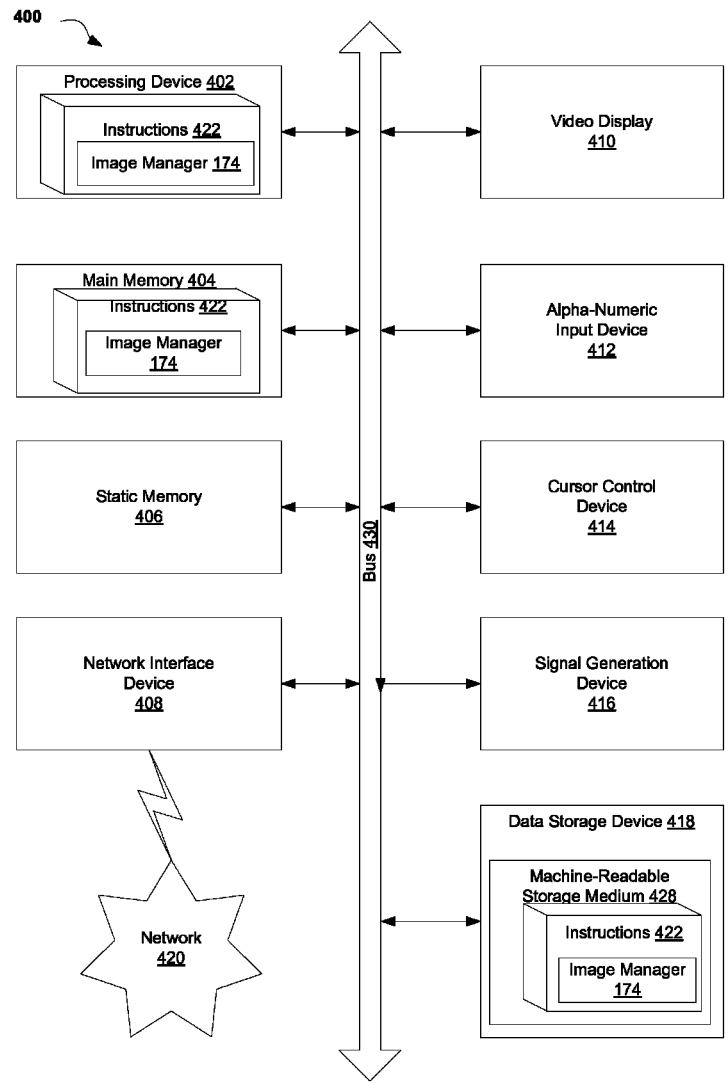
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., instructions 422) for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-readable storage medium 428 on which is stored one or more set of instructions 422 (e.g., software) embodying any one or more of the methodologies of functions described herein. The instructions 422 may also reside, completely or at least partially, within the main memory 404 and/or within the processing device 402 during execution thereof by the computer system 400; the main memory 404 and the processing device 402 also constituting machine-readable storage media.

The machine-readable storage medium 428 may also be used to store instructions for a connection broker (e.g., connection broker 170 of FIG. 1) or connection agent (e.g., connection agent 180 of FIG. 1), and/or a software library containing methods that call the connection broker or connection agent. While the machine-readable storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
upon detecting that a client has disconnected from a virtual machine, initiating, by a processing device, a timer;
upon determining the timer has timed out and the client has failed to reestablish a connection with the virtual machine, saving, by the processing device, a runtime state of the virtual machine;
shutting down, by the processing device, the virtual machine upon saving the runtime state;
upon receiving a request from the client to use the virtual machine, determining whether the virtual machine was shut down by a client disconnect; and
upon determining that the client was shut down by the client disconnect, loading the virtual machine on a host using the saved runtime state.

2. The method of claim 1, further comprising:
upon determining that the virtual machine is not currently running and that
the client was not shut down by the client disconnect, starting up the virtual machine; and
connecting the client to the virtual machine.

3. The method of claim 2, wherein the client generates the request upon receiving a user selection of a resume virtual machine option presented in a graphical user interface of the client.

4. The method of claim 1, wherein detecting that the client has disconnected from the virtual machine comprises receiving a notification from the virtual machine that the client has disconnected.

5. The method of claim 1, wherein the client is a thin client, and the virtual machine is a virtual desktop that provides a desktop environment to the client.

6. The method of claim 1, further comprising:
upon determining the timer has timed out and the client has failed to reestablish a connection with the virtual machine, determining whether any additional clients are connected to the virtual machine; and
upon determining that no additional clients are connected to the virtual machine, shutting down the virtual machine.

7. The method of claim 1, wherein saving the runtime state of the virtual machine comprises:
generating a virtual machine image based on a difference between a current runtime state of the virtual machine and an initial runtime state of the virtual machine included in a base image.

8. The method of claim 1, wherein the runtime state of the virtual machine comprises a memory state of the virtual machine, a state of a storage associated with the virtual machine, and a state of a plurality of registers of a virtualized central processing unit (CPU) associated with the virtual machine.

9. A non-transitory machine-readable storage medium including instructions that, when executed by a processing device, cause the processing device to:
upon detecting that a client has disconnected from a virtual machine, initiate, by the processing device, a timer;
upon determining the timer has timed out and the client has failed to reestablish a connection with the virtual machine, save, by the processing device, a runtime state of the virtual machine;
shut down, by the processing device, the virtual machine upon saving the runtime state;
upon receiving a request from the client to use the virtual machine, determine whether the virtual machine was shut down by a client disconnect; and
upon determining that the client was shut down by the client disconnect, load the virtual machine on a host using the saved runtime state.

10. The non-transitory machine-readable storage medium of claim 9, wherein the processing device is further to:
upon determining that the virtual machine is not currently running and that
the client was not shut down by the client disconnect, start up the virtual machine; and
connect the client to the virtual machine.

11. The non-transitory machine-readable storage medium of claim 9, wherein detecting that the client has disconnected from the virtual machine comprises receiving a notification from the virtual machine that the client has disconnected.

12. The non-transitory machine-readable storage medium of claim 11, wherein the client generates the request upon receiving a user selection of a resume virtual machine option presented in a graphical user interface of the client.

13. The non-transitory machine-readable storage medium of claim 9, wherein the client is a thin client, and the virtual machine is a virtual desktop that provides a desktop environment to the client.

14. The non-transitory machine-readable storage medium of claim 9, wherein the processing device is further to:
upon determining the timer has timed out and the client has failed to reestablish a connection with the virtual machine, determine whether any additional clients are connected to the virtual machine; and
upon determining that no additional clients are connected to the virtual machine, shut down the virtual machine.

15. The non-transitory machine-readable storage medium of claim 9, wherein to save the runtime state of the virtual machine, the processing device is further to:
generate a virtual machine image based on a difference between a current runtime state of the virtual machine and an initial runtime state of the virtual machine included in a base image.

16. An apparatus comprising:
a memory to store instructions for managing a virtual machine; and
a processing device operatively coupled to the memory, the processing device to:
upon detecting that a client has disconnected from a virtual machine running on a host, initiate a timer;
upon determining that the timer has timed out and that the client has failed to reestablish a connection with the virtual machine, save a runtime state of the virtual machine;
shut down the virtual machine upon saving the runtime state;
upon receipt of a request from the client to use the virtual machine and upon a determination that the virtual machine is not currently running, determine whether the virtual machine was shut down by a client disconnect;
upon determining the client was shut down by the client disconnect, load the virtual machine on a host using the saved runtime state;
upon determining the client was not shut down by the client disconnect, start up the virtual machine; and
connect the client to the virtual machine.

17. The computing apparatus of claim 16, wherein detecting that the client has disconnected from the virtual machine comprises receiving a notification from the virtual machine that the client has disconnected.

18. The computing apparatus of claim 16, wherein the client generates the request upon receiving a user selection of a resume virtual machine option presented in a graphical user interface of the client.

19. The computing apparatus of claim 16, wherein the client is a thin client, and the virtual machine is a virtual desktop that provides a desktop environment to the client.

20. The computing apparatus of claim 16, wherein the processing device is further to:
upon a determination that the timer has timed out and the client has failed to reestablish a connection with the virtual machine, determine whether any additional clients are connected to the virtual machine; and
upon determining that no additional clients are connected to the virtual machine, shut down the virtual machine.

* * * * *